(12) United States Patent
Azancot et al.

(10) Patent No.: US 8,618,695 B2
(45) Date of Patent: Dec. 31, 2013

(54) APPLIANCE MOUNTED POWER OUTLETS

(75) Inventors: Yossi Azancot, Jerusalem (IL); Amir Ben-Shalom, Modiin (IL); Oola Greenwald, Mevasseret Zion (IL); Arik Rofe, Jerusalem (IL); Ariel Katz, Herzeliya (IL)

(73) Assignee: Powermat Technologies, Ltd, Neve Ilan (IL)

( * ) Notice: Subject to any disclaimer, the term of this patent is extended or adjusted under 35 U.S.C. 154(b) by 0 days.

(21) Appl. No.: 12/957,506

(22) Filed: Dec. 1, 2010

(65) Prior Publication Data

US 2011/0121660 A1    May 26, 2011

Related U.S. Application Data

(63) Continuation of application No. PCT/IL2009/000544, filed on Jun. 1, 2009.

(60) Provisional application No. 61/129,042, filed on Jun. 2, 2008.

(51) Int. Cl.
*H01F 37/00* (2006.01)

(52) U.S. Cl.
USPC .......................................................... 307/104

(58) Field of Classification Search
USPC .......................................................... 307/104
See application file for complete search history.

(56) References Cited

U.S. PATENT DOCUMENTS

| | | |
|---|---|---|
| 723,836 A | 3/1903 | Cowing |
| 2,415,688 A | 2/1947 | Hall |
| 3,771,085 A | 11/1973 | Hojo et al. |
| 3,938,018 A | 2/1976 | Dahl |
| 4,160,193 A | 7/1979 | Richmond |
| 4,431,948 A | 2/1984 | Elder et al. |
| 4,754,180 A | 6/1988 | Kiedrowski |
| 4,977,515 A | 12/1990 | Rudden et al. |
| 5,221,877 A | 6/1993 | Falk |
| 5,278,771 A | 1/1994 | Nyenya |
| 5,367,242 A | 11/1994 | Hulman |
| 5,455,466 A | 10/1995 | Parks et al. |
| 5,455,467 A * | 10/1995 | Young et al. .................. 307/104 |

(Continued)

FOREIGN PATENT DOCUMENTS

| | | |
|---|---|---|
| EP | 0160990 A2 | 11/1985 |
| EP | 0357839 A1 | 3/1990 |

(Continued)

OTHER PUBLICATIONS

Liu et al. "An Analysis of a Double-layer Electromagnetic Shield for a Universal Contactless Battery Charging Platform", IEEE 2005, p. 1767-1772.

(Continued)

*Primary Examiner* — Hal Kaplan
(74) *Attorney, Agent, or Firm* — Brooks Kushman P.C.

(57) ABSTRACT

An electrical appliance comprising a connection to a power source and a principle electrical load, wherein the appliance additionally comprises at least one inductive power outlet, the inductive power outlet comprising: at least one driver, connectable to the power source, the driver for providing an oscillating voltage supply; and at least one primary inductive coil connected to the driver, the primary inductive coil for inductively coupling with an external secondary inductive coil wired to a second electrical load.

14 Claims, 4 Drawing Sheets

(56) References Cited

U.S. PATENT DOCUMENTS

| | | | |
|---|---|---|---|
| 5,486,394 A | 1/1996 | Stough |
| 5,528,113 A | 6/1996 | Boys et al. |
| 5,550,452 A | 8/1996 | Shirai et al. |
| 5,600,225 A | 2/1997 | Goto |
| 5,680,035 A | 10/1997 | Haim et al. |
| 5,713,939 A | 2/1998 | Nedungadi et al. |
| 5,734,254 A | 3/1998 | Stephens |
| 5,762,250 A | 6/1998 | Carlton et al. |
| 5,821,728 A | 10/1998 | Schwind |
| 5,821,731 A | 10/1998 | Kuki et al. |
| 5,907,285 A | 5/1999 | Toms et al. |
| 5,929,598 A | 7/1999 | Nakama et al. |
| 5,949,214 A | 9/1999 | Broussard et al. |
| 6,042,005 A | 3/2000 | Basile et al. |
| 6,127,799 A | 10/2000 | Krishnan |
| 6,211,649 B1 | 4/2001 | Matsuda |
| 6,230,029 B1 | 5/2001 | Hahn et al. |
| 6,396,935 B1 | 5/2002 | Makkonen |
| 6,436,299 B1 | 8/2002 | Barrman et al. |
| 6,441,589 B1 | 8/2002 | Frerking et al. |
| 6,484,260 B1 | 11/2002 | Scott et al. |
| 6,532,298 B1 | 3/2003 | Cambier et al. |
| 6,586,909 B1 | 7/2003 | Trepka |
| 6,624,616 B1 | 9/2003 | Frerking et al. |
| 6,644,557 B1 | 11/2003 | Jacobs |
| 6,673,250 B2 | 1/2004 | Kuennen et al. |
| 6,721,540 B1 | 4/2004 | Kayakawa |
| 6,731,071 B2 | 5/2004 | Barrman |
| 6,766,040 B1 | 7/2004 | Catalano et al. |
| 6,803,744 B1 | 10/2004 | Sabo |
| 6,825,620 B2 | 11/2004 | Kuennen et al. |
| 6,888,438 B2 | 5/2005 | Hui et al. |
| 6,894,457 B2 | 5/2005 | Germagian et al. |
| 7,019,620 B2 | 3/2006 | Bohler et al. |
| D519,275 S | 4/2006 | Shertzer |
| 7,043,060 B2 | 5/2006 | Quintana |
| 7,126,450 B2 | 10/2006 | Baarman et al. |
| 7,132,918 B2 | 11/2006 | Baarman et al. |
| 7,164,255 B2 | 1/2007 | Hui |
| 7,180,248 B2 | 2/2007 | Kuennen et al. |
| 7,180,265 B2 | 2/2007 | Naskali et al. |
| 7,210,940 B2 | 5/2007 | Baily et al. |
| 7,212,414 B2 | 5/2007 | Baarman |
| 7,224,086 B2 | 5/2007 | Germagian et al. |
| 7,233,319 B2 | 6/2007 | Johnson et al. |
| 7,262,700 B2 | 8/2007 | Hsu |
| D553,852 S | 10/2007 | Brandenburg |
| 7,385,357 B2 | 6/2008 | Kuennen et al. |
| 7,392,068 B2 | 6/2008 | Dayan et al. |
| 7,405,535 B2 | 7/2008 | Frerking et al. |
| 7,462,951 B1 | 12/2008 | Baarman |
| D586,809 S | 2/2009 | Jones et al. |
| 7,518,267 B2 | 4/2009 | Baarman |
| 7,522,878 B2 | 4/2009 | Baarman |
| 7,576,514 B2 | 8/2009 | Hui |
| D599,735 S | 9/2009 | Amidei et al. |
| D599,736 S | 9/2009 | Ferber et al. |
| D599,737 S | 9/2009 | Amidei et al. |
| D599,738 S | 9/2009 | Amidei et al. |
| D603,603 S | 11/2009 | Laine et al. |
| 7,612,528 B2 | 11/2009 | Baarman et al. |
| D607,879 S | 1/2010 | Ferber et al. |
| D611,407 S | 3/2010 | Webb |
| D611,408 S | 3/2010 | Ferber et al. |
| 7,948,208 B2 * | 5/2011 | Partovi et al. ............... 320/108 |
| 2002/0057584 A1 | 5/2002 | Brockmann |
| 2002/0158512 A1 | 10/2002 | Mizutani et al. |
| 2003/0210106 A1 | 11/2003 | Cheng et al. |
| 2004/0023633 A1 | 2/2004 | Gordon |
| 2004/0195767 A1 | 10/2004 | Randall |
| 2004/0203537 A1 | 10/2004 | Yoshida et al. |
| 2004/0242264 A1 | 12/2004 | Cho |
| 2004/0261802 A1 | 12/2004 | Griffin et al. |
| 2005/0007067 A1 | 1/2005 | Baarman et al. |
| 2005/0083020 A1 | 4/2005 | Baarman |
| 2005/0130593 A1 | 6/2005 | Michalak |
| 2005/0164636 A1 | 7/2005 | Palermo et al. |
| 2005/0169506 A1 | 8/2005 | Fenrich et al. |
| 2005/0189910 A1 | 9/2005 | Hui |
| 2005/0192062 A1 | 9/2005 | Mickle et al. |
| 2005/0233768 A1 | 10/2005 | Guo et al. |
| 2006/0028176 A1 | 2/2006 | Tang et al. |
| 2006/0043927 A1 | 3/2006 | Beart et al. |
| 2006/0052144 A1 | 3/2006 | Seil et al. |
| 2006/0061325 A1 | 3/2006 | Tang et al. |
| 2006/0071632 A1 | 4/2006 | Ghabra et al. |
| 2006/0091222 A1 | 5/2006 | Leung et al. |
| 2006/0093132 A1 | 5/2006 | Desormiere et al. |
| 2006/0202665 A1 | 9/2006 | Hsu |
| 2007/0023559 A1 | 2/2007 | Scapillato et al. |
| 2007/0057763 A1 | 3/2007 | Blattner et al. |
| 2007/0076459 A1 | 4/2007 | Limpkin |
| 2007/0103110 A1 | 5/2007 | Sagoo |
| 2007/0136593 A1 | 6/2007 | Plavcan et al. |
| 2007/0165371 A1 | 7/2007 | Brandenburg |
| 2007/0182367 A1 | 8/2007 | Partovi |
| 2007/0202931 A1 | 8/2007 | Lee et al. |
| 2007/0210889 A1 | 9/2007 | Baarman et al. |
| 2007/0279002 A1 | 12/2007 | Partovi |
| 2008/0001922 A1 | 1/2008 | Johnson et al. |
| 2008/0030985 A1 | 2/2008 | Jeon et al. |
| 2008/0049988 A1 | 2/2008 | Basile et al. |
| 2008/0055047 A1 | 3/2008 | Osada et al. |
| 2008/0079388 A1 | 4/2008 | Sarnowsky et al. |
| 2008/0132293 A1 | 6/2008 | Gundlach et al. |
| 2008/0157715 A1 | 7/2008 | Rosenboom et al. |
| 2008/0223926 A1 | 9/2008 | Miller et al. |
| 2008/0258680 A1 | 10/2008 | Frerking et al. |
| 2008/0265835 A1 | 10/2008 | Reed et al. |
| 2009/0026959 A1 | 1/2009 | Lin et al. |
| 2009/0040807 A1 | 2/2009 | Doumae et al. |
| 2009/0047768 A1 | 2/2009 | Jain |
| 2009/0047769 A1 | 2/2009 | Bhat et al. |
| 2009/0075704 A1 | 3/2009 | Wang |
| 2009/0079387 A1 | 3/2009 | Jin et al. |
| 2009/0084705 A1 | 4/2009 | Justiss |
| 2009/0097221 A1 | 4/2009 | Sayed et al. |
| 2009/0102416 A1 | 4/2009 | Burley |
| 2009/0134972 A1 | 5/2009 | Wu, Jr. et al. |
| 2009/0146608 A1 | 6/2009 | Lee |
| 2009/0153098 A1 | 6/2009 | Toya et al. |
| 2009/0153297 A1 | 6/2009 | Gardner |
| 2009/0174263 A1 | 7/2009 | Baarman et al. |
| 2009/0203355 A1 | 8/2009 | Clark |
| 2009/0212639 A1 | 8/2009 | Johnson |
| 2009/0226050 A1 | 9/2009 | Hughes |
| 2009/0243791 A1 | 10/2009 | Partin et al. |
| 2009/0251102 A1 | 10/2009 | Hui |
| 2009/0273891 A1 | 11/2009 | Peiker |
| 2009/0278494 A1 | 11/2009 | Randall |
| 2010/0039066 A1 | 2/2010 | Yuan et al. |

FOREIGN PATENT DOCUMENTS

| | | |
|---|---|---|
| EP | 0160990 B1 | 1/1991 |
| EP | 0558316 A1 | 9/1993 |
| EP | 0845695 A2 | 6/1998 |
| EP | 1990734 A1 | 11/2008 |
| FR | 2695285 A3 | 3/1994 |
| FR | 2739929 A1 | 4/1997 |
| GB | 778072 | 7/1957 |
| GB | 2399466 A | 9/2001 |
| GB | 2399466 B | 11/2005 |
| GB | 2429372 A | 2/2007 |
| JP | 04-156242 | 5/1992 |
| JP | 07-039078 | 2/1995 |
| JP | 07-036556 | 7/1995 |
| JP | 2001-309579 | 11/2001 |
| JP | 2005-006440 | 1/2005 |
| JP | 2005-110412 | 4/2005 |
| JP | 2005327845 A | 11/2005 |
| JP | 2006-102055 | 4/2006 |
| JP | 2007-529110 | 10/2007 |
| WO | 9602879 A1 | 2/1996 |

(56) References Cited

FOREIGN PATENT DOCUMENTS

| WO | 0201557 | A1 | 1/2002 |
|---|---|---|---|
| WO | 0215320 | A1 | 2/2002 |
| WO | 2005041281 | A1 | 5/2005 |
| WO | 2005043775 | A1 | 5/2005 |
| WO | 2006015143 | A2 | 2/2006 |
| WO | 2008030985 | A2 | 3/2008 |
| WO | 2008086080 | A2 | 7/2008 |
| WO | 2008093334 | A2 | 8/2008 |
| WO | 2008114268 | A2 | 9/2008 |
| WO | 2009040807 | A2 | 4/2009 |
| WO | 2009047768 | A2 | 4/2009 |
| WO | 2009047769 | A2 | 4/2009 |
| WO | 2009049657 | A1 | 4/2009 |
| WO | 2009108958 | A1 | 9/2009 |
| WO | 2010025156 | A1 | 3/2010 |
| WO | 2010025157 | A1 | 3/2010 |

OTHER PUBLICATIONS

Hui et al. "A New Generation of Universal Contactless Battery Charging Platform for Portable Consumer Electronic Equipment", IEEE Transactions on Power Electronics May 2005, vol. 20, No. 3, p. 620-627.

Liu et al. "Equivalent Circuit Modeling of a Multilayer Planar Winding Array Structure for Use in a Universal Contactless Battery Charging Platform", IEEE Transactions on Power Electronics Jan. 2007, vol. 22, No. 1, p. 21-29.

Tang et al. "Evaluation of the Shielding Effects on Printed-Circuit-Board Transformers Using Ferrite Plates and Copper Sheets", IEEE Transactions on Power Electronics Nov. 2002, vol. 17, No. 6, p. 1080-1088.

Su et al. "Extended Theory on the Inductance Calculation of Planar Spiral Windings Including the Effect of Double-layer Electromagnetic Shield", IEEE 2007, p. 3022-3028.

Liu et al. "Optimal Design of a Hybrid Winding Structure for Planar Contactless Battery Charging Platform", IEEE Transactions on Power Electronics Jan. 2008, vol. 23, No. 1, p. 455-463.

Liu et al. "Simulation Study and Experimental Verification of a Universal Contactless Battery Charging Platform With Localized Charging Features", IEEE Transactions on Power Electronics Nov. 2007, vol. 22, No. 6, p. 2202-2210.

International Search Report for PCT/IL2009/000915, Completed by the European Patent Office on Mar. 15, 2010, 3 Pages.

International Search Report and Written Opinion for PCT/IL2008/001282, Both completed by the US Patent Office on Feb. 25, 2009, All together 9 Pages.

International Search Report and Written Opinion for PCT/IL2008/001347, Both completed by the US Patent Office on Feb. 2, 2009, All together 10 Pages.

International Search Report and Written Opinion for PCT/IL2008/001348, Both completed by the US Patent Office on Jan. 28, 2009, All together 9 Pages.

International Search Report for PCT/IL08/01641, Completed by the US Patent Office on May 21, 2009, 3 Pages.

International Search Report for PCT/IL2008/000124, Completed by the European Patent Office on Nov. 3, 2008, 5 Pages.

International Search Report for PCT/IL09/00544, Completed by the US Patent Office on Sep. 16, 2009, 1 Page.

International Search Report for PCT/IL2009/000681, Completed by the European Patent Office on Sep. 16, 2009, 3 Pages.

Hatanaka et al. "Power Transmission of a Desk With a Cord-Free Power Supply", IEEE Transactions on Magnetics Sep. 2002, vol. 38, No. 5, p. 3329-3331.

Chwang et al. "Thin film encapsulated flexible organic electroluminescent displays", Applied Physics Letters Jul. 21, 2003, vol. 83, No. 3, p. 413-415.

Office Action dated Mar. 22, 2013, for Mexican Application MX/a/2011/003088.

Office Action dated Feb. 5, 2013, for Chinese Application 201110068458.7.

Office Action dated May 28, 2013, for Japanese Application 2010-526422.

Office Action dated May 28, 2013, for Japanese Application 2010-528526.

Office Action dated May 21, 2013, for Japanese Application 2011-500345.

\* cited by examiner

APPLIANCE MOUNTED POWER OUTLETS

CROSS-REFERENCE TO RELATED APPLICATIONS

This application is a continuation of International Application No. PCT/IL2009/000544 filed Jun. 1, 2009, which claims priority to U.S. Provisional Application 61/129,042 filed Jun. 2, 2008, the disclosures of which are hereby incorporated by reference in their entirety.

FIELD OF THE INVENTION

The present invention relates to inductive power provision. More specifically, the invention relates to inductive power outlets mounted upon host electrical devices.

BACKGROUND

Electrical devices need to be connected to an electrical power source in order to be operated. Unless the electrical device carries an internal power supply such as a battery, the device is dependant upon significant infrastructure to provide it with power. The power providing infrastructure typically includes a power outlet wired to a mains power line. Power cables connected to electrical devices typically draw power from a mains line via plug-and-socket connectors.

In recent times, there has been a rapid proliferation of electrical devices in both the home and work environments. In a modern kitchen for example, there is need to provide electricity to numerous high power appliances such as ovens, refrigerators, dishwashers, washing machines and dryers, as well as to various worktop gadgets such as toasters, kettles, mixers and the like which are increasingly considered necessities rather than luxury items. The high power devices are usually stationary, hard-wired to high current mains outlets, whereas gadgets are often movable, being stored away in cupboards and brought out to the worktop when necessary.

The infrastructure required to provide power to these devices has not always been able to keep up with the increased demand for power. In many kitchens, such devices often need to share a single power outlet. In order to connect many electrical devices to the mains, power strips may be used. Power strips provide many sockets all of which connect to the mains via a single plug-and-socket connector.

Although convenient, power strips can represent a significant hazard. A single plug-and-socket connector is usually designed to provide power to a single appliance. By plugging in a number of appliances to a single connector, the connector may become overloaded which can cause overheating or even fire. This is a particular problem where devices are regularly plugged and unplugged into the socket. Disconnecting an electrical load from a power source by unplugging a plug-and-socket connector can produce sparking which damages the connectors and may cause them to heat up excessively. Some small gadgets, such as kettles, which require unplugging to be filled, nevertheless require high currents. Especially in the kitchen environment, the greater the number of power sockets, the greater the chance that water may spill into them. It has been proposed that inductive rather than conductive power connectors may be used to reduce this hazard.

Inductive power coupling allows energy to be transferred from a power supply to an electric load without any conduction path therebetween. An inductive coil and a driver are wired to a power supply. The driver applies an oscillating electric potential across the inductive coil which serves as the primary coil of an inductive couple. The oscillating electric potential induces an oscillating magnetic field which may induce an oscillating electrical current in a secondary coil placed close to the primary coil. In this way, electrical energy is transmitted from the primary coil to the secondary coil by electromagnetic induction without the two coils being conductively connected. An electric load wired in series with the secondary coil may draw energy from the power source when the secondary coil is inductively coupled to the primary coil.

Because there is no conductive path between the connectors, inductive power connectors do not spark. Furthermore because electrical components of inductive power outlets may be sealed to prevent water from penetrating the connection, they are safer in wet environments. Nevertheless, inductive power outlets require additional infrastructure, such as drivers and inductive coils, which are not generally available with existing mains power lines.

There is a need for inductive power outlets which can be integrated with existing mains power lines without the need for additional infrastructure. The present invention addresses this need.

SUMMARY OF THE INVENTION

It is an aim of the current invention to provide a solution to providing an electrical appliance comprising a connection to a power source and a principle electrical load, wherein the appliance additionally comprises at least one inductive power outlet, the inductive power outlet comprising: at least one driver, connectable to the power source, the driver for providing an oscillating voltage supply; and at least one primary inductive coil connected to the driver, the primary inductive coil for inductively coupling with an external secondary inductive coil wired to a second electrical load.

Typically, the power source comprises a mains electricity line. Alternatively, the power source is integral to the electrical appliance. For example, the power source may comprise at least one electrochemical power cell.

Preferably, the parasitic power outlet additionally comprises at least a first ferromagnetic core for providing flux guidance between the primary inductive coil and the secondary inductive core.

According to various embodiments, the principle load may be selected from the group consisting of: electrical heaters, electrical motors, refrigeration units, compressors, display units, loudspeakers, electrical clocks, electromagnetic transducers and computers.

In particular embodiments of the invention the appliance is selected from the group comprising: refrigerators, freezers, dishwashers, ovens, microwaves, washing machines, dryers, photocopiers, computers, printers, scanners, televisions, home entertainment centers, audio players and video players. Optionally, the parasitic power outlet is incorporated into a substantially flat portion of the appliance.

Optionally, the appliance comprises an attachment means for mechanically attaching the external secondary inductive coils in alignment with the primary inductive coils.

In certain embodiments the parasitic power outlets additionally comprise data channels for allowing data exchange between the power outlets and secondary units comprising the secondary coils.

In accordance with further embodiments of the invention the appliance of claim 1 comprises an array of the parasitic power outlets. Optionally the driver may be connected to a plurality of the primary inductive coils.

In still further embodiments, the power source comprises a further secondary inductive coil wired to the appliance for coupling with an external primary inductive coil wired to a second power source.

A second aim of the invention is to provide a method for distributing power from an electrical power source wired to a first electrical load, the method comprising the steps of:
a. wiring at least one inductive power outlet in parallel with the first electrical load, the inductive power outlet comprising:
   at least one primary inductive coil; and
   at least one driver for providing an oscillating voltage supply to the primary inductive coil; and
b. inductively coupling the primary inductive coil with an external secondary inductive coil wired to a second electrical load.

BRIEF DESCRIPTION OF THE FIGURES

For a better understanding of the invention and to show how it may be carried into effect, reference will now be made, purely by way of example, to the accompanying drawings.

With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention; the description taken with the drawings making apparent to those skilled in the art how the several forms of the invention may be embodied in practice. In the accompanying drawings.

DESCRIPTION OF THE PREFERRED EMBODIMENTS

Figure 1:
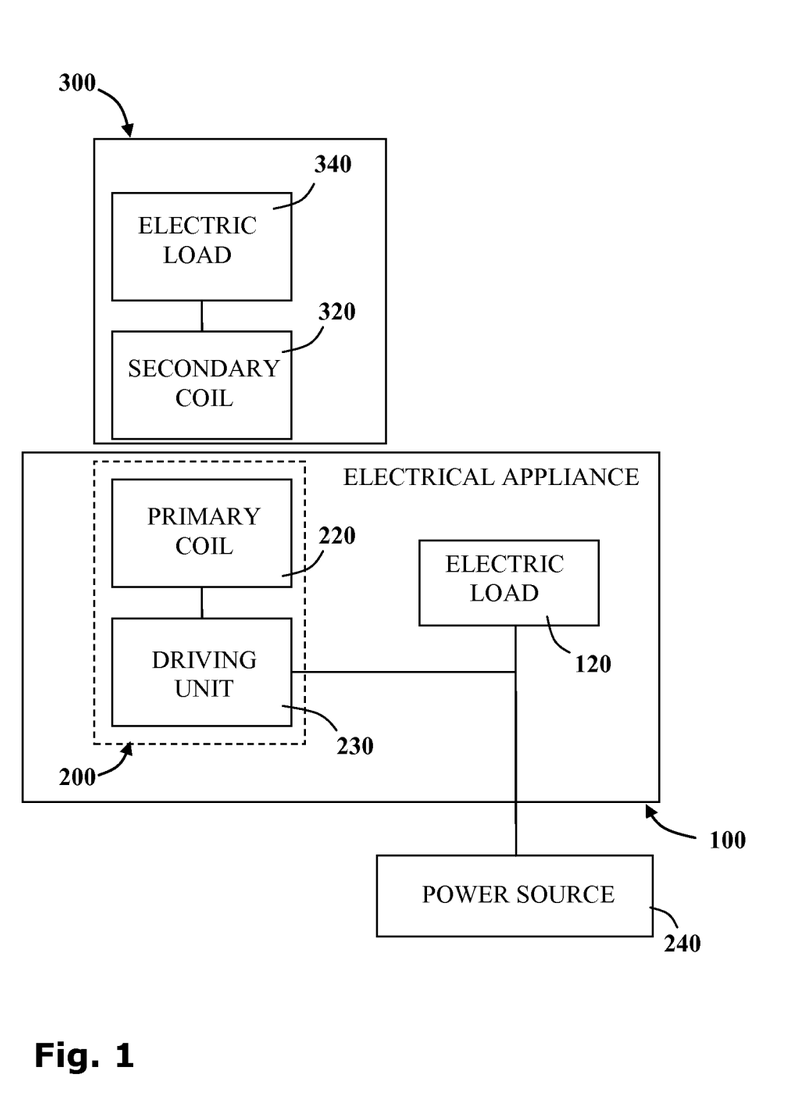
FIG. 1 is a block diagram showing the main elements of an inductive power outlet mounted upon an electrical appliance according to a first embodiment of the invention.

Reference is now made to FIG. 1 which is a block diagram showing the main elements of an inductive power outlet 200 mounted upon a host electrical appliance 100 according to a first embodiment of the invention. The appliance 100 is designed to perform a particular function and includes a principal electric load 120 which is connectable to a power source 240.

The power source 240 may be connected to the host appliance 100 via power a conventional plug-and-socket connector to a mains line (not shown). The inductive power outlet 200 may be incorporated into a domestic appliance such as a refrigerator, freezer, dishwasher, hob, oven, microwave, washing machine, dryer, television, home entertainment center, video player, audio player or the like. In an office environment such an inductive power outlet 200 may be incorporated into equipment such as photocopiers, computers, printers and scanners for example.

According to the function of the appliance, the principle load 120 of the appliance may be, for example, an electrical heater, an electrical motor, a refrigeration unit, a compressor, a display unit, a loudspeaker, an electrical clock, an electromagnetic transducer and a computer processor.

In other embodiments the power source 240 is integral to the host appliance, for example, an internal electrical power cell of a laptop computer or an electric generator driven by an internal combustion engine.

It is a particular feature of embodiments of the present invention that the inductive power outlet 200 includes at least one primary inductive coil 220 connected to the power source 240 via a driver 230. The driver 230 is configured to provide the electronics necessary to drive the primary coil 220. Driving electronics typically includes a switching unit for providing a high frequency oscillating voltage supply.

A secondary inductive coil 320 wired to a second electrical load 340, typically housed in an external movable secondary unit 300, may be brought into proximity with the inductive power outlet 200. The primary inductive coil 220 is configured to inductively couple with the secondary inductive coil 320 aligned therewith. The second electrical load 340 is configured to draw power from the secondary inductive coil 320.

According to preferred embodiments of the invention, the inductive power outlet 200 includes a ferromagnetic core for providing flux guidance between the primary inductive coil 220 and the secondary inductive coil 320.

It will be appreciated that the present invention is of particular utility in a domestic kitchen environment. A large number of electrical labor saving devices are commonly used in the modern kitchen, such as, inter alia, mixers, blenders, egg beaters, bread-makers, liquidizers, orange juice extractors, vegetable juicers, food-processors, electric knives, toasters, sandwich toasters, waffle makers, electrical barbecue grills, slow cookers, hot-plates, deep-fat fryers, electrical frying pans, knife sharpeners, domestic sterilizers, kettles, urns, radios, televisions, computers, cassette players, CD players, media players, steamers, egg boilers, coffee makers, rice maker and electrical tin-openers and the like. However, kitchens are hazardous environments for using electricity as water can easily enter conventional electrical sockets. In contradistinction to conventional sockets, inductive power outlets can be sealed to make them waterproof, thereby preventing water from making contact with the conducting elements therewithin. Indeed, electrical devices adapted to receive power inductively may be designed to be cleaned by loading into a dishwasher.

Although, it may be useful to provide a dedicated inductive power outlet surface for use in the kitchen environment, it is particularly useful to incorporate such a power providing surface to an existing electrical appliance which is already being plugged into a mains power outlet because no additional power outlets are required.

Figure 2:
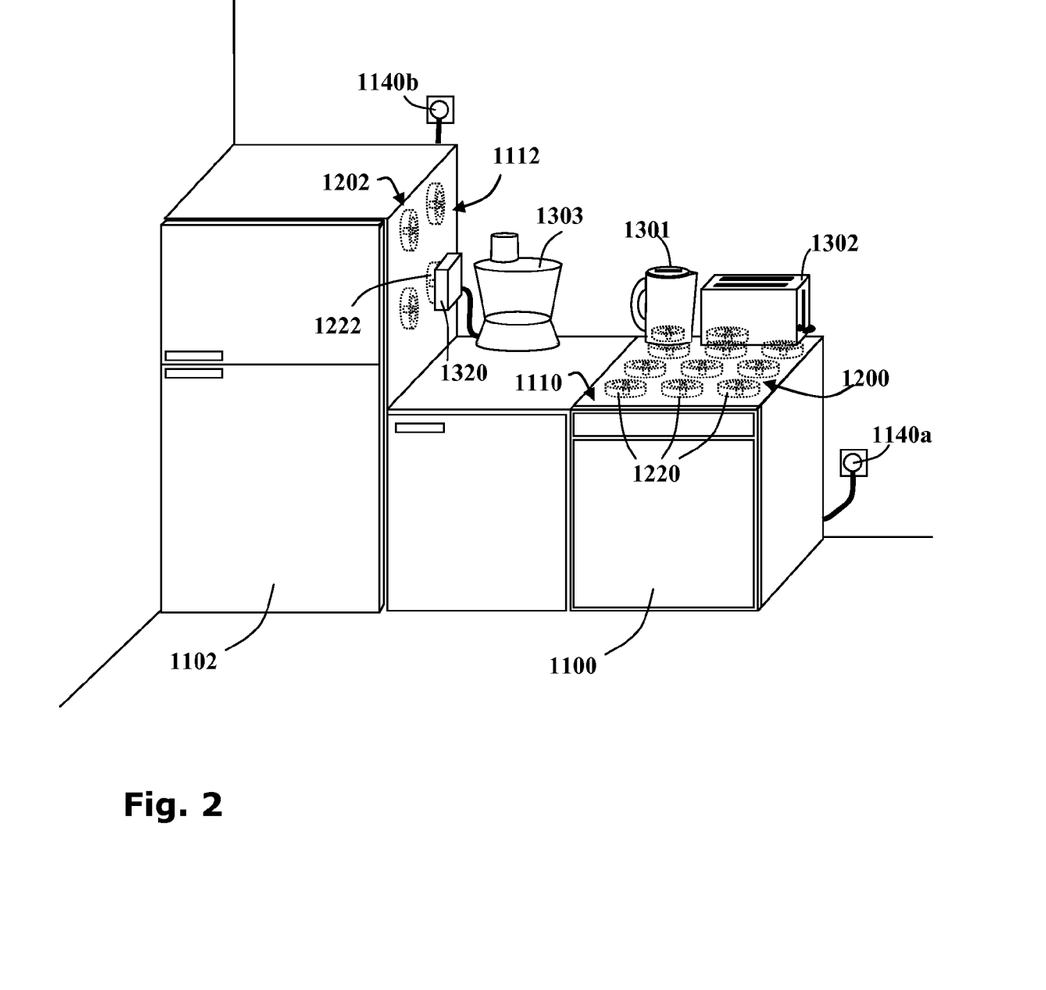
FIG. 2 is a schematic diagram of a kitchen including multi-coiled inductive power outlets incorporated into the flat surfaces of large kitchen appliances according to other embodiments of the invention.

An exemplary embodiment of the invention for use in a domestic kitchen environment is shown in FIG. 2. An array of inductive power outlets 1200 is incorporated into the flat top surface 1110 of a domestic kitchen appliance 1100 such as a dishwasher, for example, which is itself connected to a conventional plug-and-socket mains power outlet 1140*a*. The inductive power outlets 1200 are used to provide power to worktop kitchen appliances such as a kettle 1301 or toaster 1302, for example.

A second array of inductive power outlets 1202 is incorporated into the side 1112 of a fridge-freezer 1102, also connected to a conventional plug-and-socket mains power outlet 1140*b*. Inductive power receivers 1320 may be attached magnetically to the side 1112 of the fridge-freezer 1102 or via suction means or the like. An electrical device, such as a food processor 1303 for example, wired to such inductive power receivers 1320 may draw power from the power outlet 1222.

It will be appreciated that the provision of inductive power outlets 1200, 1202 incorporated into large electrical appliances 1100, 1102 require no special infrastructure. The power is drawn from the mains via conventional plug-and-socket power outlets 1140*a*, 1140*b*.

It is further noted that in multicoil power outlets 1200, the driving unit 230 (FIG. 1) may also regulate the power delivered to the primary coils 1220 in order to prevent overloading. A controller (not shown) could monitor the power delivered to the multicoil power outlet 1200 and provide power to more than one primary coil 1220 such that the total power drawn by the system remains within an acceptable range. Multiple coils may be activated simultaneously, sequentially or intermittently, for example as required.

Figure 3:
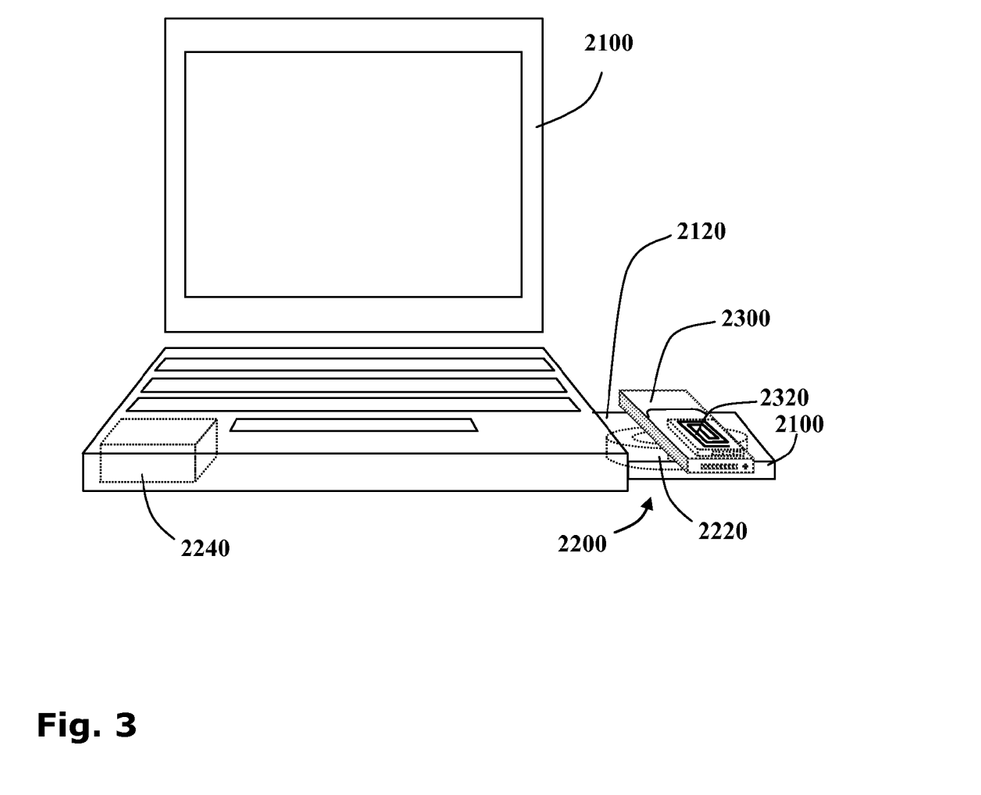
FIG. 3 is a schematic diagram of a laptop computer including an inductive power outlet being used to charge a mobile phone, according to still another embodiment of the invention.

Another embodiment of the invention is shown in FIG. 3 for use, for example, in an office environment. An inductive power outlet 2200 is incorporated into a computer 2100. The primary inductive coil 2220 of the computer 2100 may be used to charge an external device such as a mobile phone 2300, a PDA, a media player or the like wired to secondary inductive coil 2320. For convenience, the power outlet 2200 may be provided upon a drawer 2120 which extends from the computer 2100. Alternatively, the power outlet 2200 may be incorporated into a DVD/CD drive which is retrofittable to the computer 2100.

It is noted that, when a laptop computer 2100 is disconnected from the mains, the internal power cells 2240 may serve as the power source for the power outlet 2200. An analogous use is already made of computers 2100 to charge external devices such as media players, mobile phones, mice, Bluetooth devices and the like, generally using dedicated cables such as via USB (universal serial bus) ports. One advantage of the inductive power outlet 2200 is that no such dedicated cables are needed It is noted that the inductive power outlet 2200 may additionally include data channels for communicating between the computer 2100 and the external device 2300. A signal transfer system may therefore be incorporated into the outlet 2200. Various transmitters and receivers may be used with the signal transfer system. For example, a light emitting diode may serve as a transmitter which sends encoded optical signals over short distances to a photo-transistor which serves as a receiver. In systems where alignment between the transmitter and receiver may be problematic, alternative systems may be preferred such as ultrasonic signals transmitted by piezoelectric elements or radio signals such as Bluetooth, WiFi and the like. Alternatively the primary and secondary coils may themselves serve as the transmitter and receiver.

Figure 4:
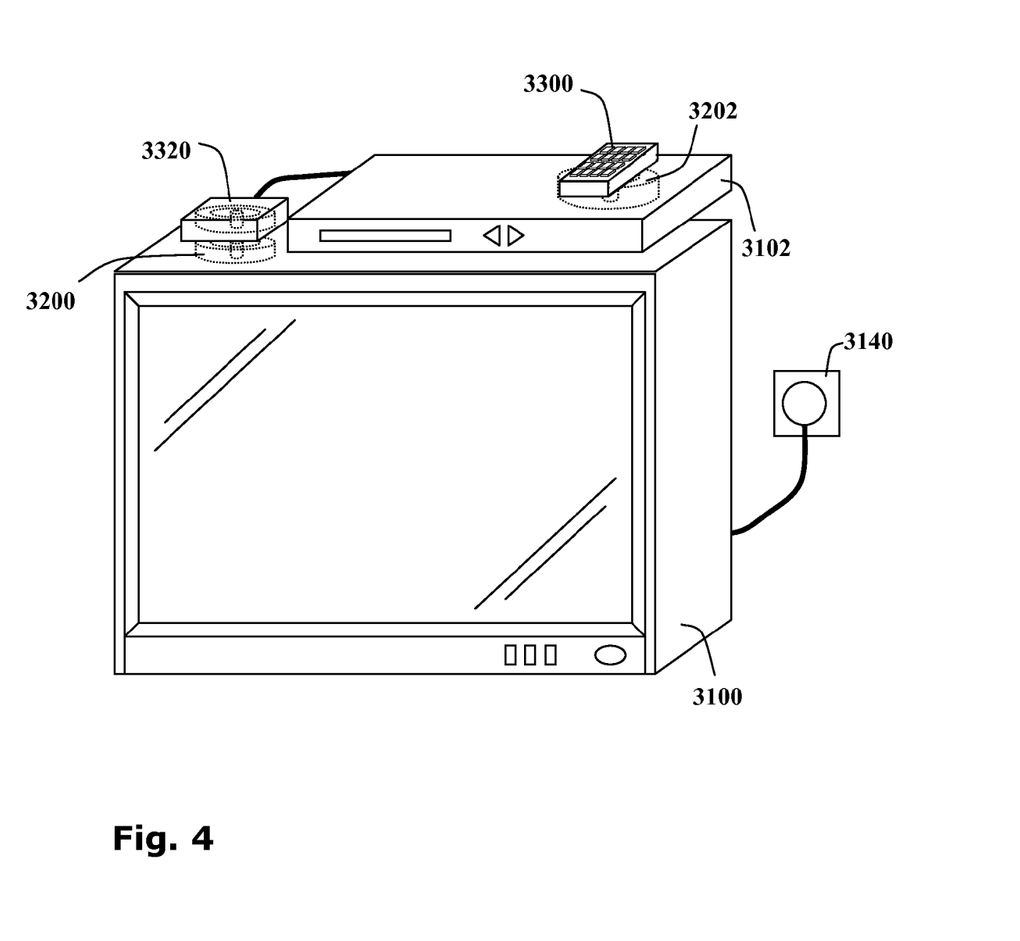
FIG. 4 is a schematic diagram of a television including an inductive power outlet being used to power a DVD player itself inductive power outlet used charge a remote control unit.

With reference now to FIG. 4, another embodiment of the invention is shown in which the host appliance is a television set 3100. The television set 3100 is connected to the mains via a conventional plug-and-socket mains power outlet 3140. An inductive power outlet 3200 is incorporated into the television set 3100 for inductively providing power to auxiliary appliances 3102, such as a DVD player, which is configured to receive power inductively via a secondary inductive coil 3320. Optionally the auxiliary appliance 3102 additionally includes a second inductive outlet 3202 for coupling with one or more further auxiliary appliances, such as a remote control unit 3300, for example. It will be apparent that, the embodiment described hereabove is extendable to include further host appliances which may be daisy chained such that power may be provided to all devices from a single mains outlet.

Thus, an inductive power distributor is described which is incorporated into a host appliance connected to a power source. The inductive power distributor is convenient, safe and can be integrated into existing electrical power infrastructure.

The scope of the present invention is defined by the appended claims and includes both combinations and sub combinations of the various features described hereinabove as well as variations and modifications thereof, which would occur to persons skilled in the art upon reading the foregoing description.

In the claims, the word "comprise", and variations thereof such as "comprises", "comprising" and the like indicate that the components listed are included, but not generally to the exclusion of other components.

What is claimed:

1. An inductive power distribution system incorporated into a generally stationary host appliance, wherein the generally stationary host appliance comprises a principal electrical load connected to a power source, said system comprising at least one inductive power outlet mounted upon the generally stationary host appliance.

2. The system of claim 1 wherein said inductive power outlet is incorporated into a substantially flat portion of said host appliance.

3. The system of claim 1 wherein said power source is selected from at least one of a mains electricity line or an electrochemical power cell.

4. The system of claim 1 wherein said power source is integral to said host appliance.

5. The system of claim 1 wherein said host appliance comprises an inductive power receiver and said power source comprises an external inductive power outlet.

6. The system of claim 1 wherein said host appliance is selected from a group consisting of: refrigerators, freezers, dishwashers, ovens, microwaves, washing machines, dryers, photocopiers, computers, printers, scanners, televisions, home entertainment centers, audio players and video players.

7. The system of claim 1 wherein said principal load is selected from a group consisting of: electrical heaters, electrical motors, refrigeration units, compressors, display units, loudspeakers, electrical clocks, electromagnetic transducers and computers.

8. The system of claim 1 further comprising an attachment means for mechanically attaching an inductive power receiver to said inductive power outlet.

9. The system of claim 1 wherein said inductive power outlets additionally comprise data channels for allowing data exchange between said inductive power outlets and inductive power receivers.

10. The system of claim 1 wherein said inductive power outlet comprises:
    at least one driver configured to connect to the power source and operable to provide an oscillating voltage supply, and at least one primary inductive coil connected to the driver and configured to couple inductively with an external secondary inductive coil wired to a second electrical load.

11. The system of claim 10 wherein said inductive power outlet further comprises: at least a first ferromagnetic core for providing flux guidance between said primary inductive coil and said secondary inductive coil.

12. The system of claim 10 wherein said driver is connected to a plurality of said primary inductive coils.

13. The system of claim 1 comprising an array of said inductive power outlets.

14. A method for distributing power inductively comprising:
- providing a generally stationary host appliance comprising a principal load and having at least one inductive power outlet mounted thereupon;
- connecting said generally stationary host appliance to a power source;
- providing an inductive power receiver;
- inductively coupling said inductive power receiver to at least one said inductive power outlet; and
- providing an oscillating voltage to a primary inductive coil of said inductive power outlet such that a voltage is induced in a secondary inductive coil of said inductive power receiver.

* * * * *